(12) United States Patent
Pelt et al.

(10) Patent No.: US 9,465,763 B2
(45) Date of Patent: Oct. 11, 2016

(54) BRIDGE CIRCUITRY FOR COMMUNICATIONS WITH DYNAMICALLY RECONFIGURABLE CIRCUITS

(71) Applicant: Altera Corporation, San Jose, CA (US)

(72) Inventors: Robert L. Pelt, San Jose, CA (US); Sam Hedinger, San Jose, CA (US)

(73) Assignee: Altera Corporation, San Jose, CA (US)

(*) Notice: Subject to any disclaimer, the term of this patent is extended or adjusted under 35 U.S.C. 154(b) by 532 days.

(21) Appl. No.: 13/919,899

(22) Filed: Jun. 17, 2013

(65) Prior Publication Data

US 2014/0372654 A1     Dec. 18, 2014

(51) Int. Cl.
  *G06F 13/40* (2006.01)

(52) U.S. Cl.
  CPC ......... *G06F 13/4027* (2013.01); *G06F 13/404* (2013.01); *G06F 13/4018* (2013.01); *G06F 13/4054* (2013.01)

(58) Field of Classification Search
  CPC ........... G06F 13/4004; G06F 13/4009; G06F 13/4027; G06F 13/404; G06F 13/405; G06F 13/4059; G06F 13/387; G06F 13/4054; G06F 13/4018
  See application file for complete search history.

(56) References Cited

U.S. PATENT DOCUMENTS

| | | | |
|---|---|---|---|
| 5,784,291 A | 7/1998 | Chen et al. | |
| 5,815,677 A * | 9/1998 | Goodrum | G06F 13/4059 710/22 |
| 5,842,005 A | 11/1998 | Walsh et al. | |
| 5,848,251 A | 12/1998 | Lomelino et al. | |
| 6,430,631 B1 | 8/2002 | He et al. | |
| 6,681,354 B2 | 1/2004 | Gupta | |
| 6,766,406 B1 | 7/2004 | Gasperini et al. | |
| 7,062,589 B1 | 6/2006 | Crosland | |
| 7,246,194 B2 * | 7/2007 | Train | G05B 19/4186 710/305 |
| 7,493,472 B2 | 2/2009 | Baxter | |
| 8,271,716 B2 * | 9/2012 | Srinivasan | G06F 5/00 710/310 |
| 8,390,325 B2 | 3/2013 | Box et al. | |
| 2007/0250676 A1 * | 10/2007 | Lietz | G06F 13/4059 711/165 |
| 2007/0274330 A1 * | 11/2007 | Lietz | H04L 12/4625 370/402 |
| 2008/0028253 A1 * | 1/2008 | Shaw | H04L 7/00 713/503 |
| 2009/0094399 A1 * | 4/2009 | Daniel | G06F 13/4022 710/311 |
| 2009/0125663 A1 * | 5/2009 | Schoegler | G06F 13/4059 710/305 |
| 2010/0191859 A1 * | 7/2010 | Raveendran | H04L 65/605 709/231 |
| 2011/0225334 A1 * | 9/2011 | Byrne | G06F 13/4059 710/110 |
| 2014/0051372 A1 * | 2/2014 | Shoshan | H04M 1/72519 455/90.2 |
| 2014/0145758 A1 * | 5/2014 | Atsatt | H03K 19/1731 326/41 |

* cited by examiner

Primary Examiner — Thomas J Cleary
(74) Attorney, Agent, or Firm — Treyz Law Group; Vineet Dixit

(57) ABSTRACT

A bridge circuit may be used to interface between dynamically reconfigurable circuitry and dedicated circuitry or other circuitry having static configurations during normal operation of the device. The bridge circuit may include interface circuitry coupled between first and second interfaces that communicate with the dynamically reconfigurable circuitry and the dedicated circuitry. Control circuitry may control the interface circuitry based on variable communications requirements of the second interface without interrupting communications with the dedicated circuitry at the first interface. The variable communications requirements may be dependent on which configuration of the dynamically reconfigurable circuitry is currently implemented.

22 Claims, 14 Drawing Sheets

|  | ADDRESS AT IF1 | ADDRESS AT IF2 |
|---|---|---|
| 204 | ADRD1 | ADRP1 |
| 206 | ADRD2 | ADRP2 |
| 208 | ADRD3 | ADRP3 |
| | ⋮ | |

ADDRESS REMAP TABLE

FIG. 8

BRIDGE CIRCUITRY FOR COMMUNICATIONS WITH DYNAMICALLY RECONFIGURABLE CIRCUITS

BACKGROUND

Programmable integrated circuits are a type of integrated circuit that can be configured by a user to implement custom logic functions. In a typical scenario, a logic designer uses computer-aided design (CAD) tools to design a custom logic circuit. When the design process is complete, the CAD tools generate configuration data. The configuration data is loaded into a programmable integrated circuit to configure the device to perform desired logic functions.

Programmable integrated circuits may include circuitry that can be reconfigured (programmed) during normal operation (e.g., subsequent to initial loading of configuration data and during run-time). Circuitry that can be reconfigured during normal operation may sometimes be referred to herein as dynamically reconfigurable circuitry. However, it can be challenging to accommodate dynamically reconfigurable circuitry in an integrated circuit. For example, dynamically reconfigurable circuitry often communicates with other circuitry that is not reconfigurable during normal operation. The other circuitry may be unable to accommodate new configurations of the dynamically reconfigurable circuitry, because interfaces of the other circuitry are typically static and can only handle communications having predetermined attributes.

In some scenarios, a programmable interface may be provided between dynamically reconfigurable circuitry and other circuitry. To handle new configurations of the dynamically reconfigurable circuitry, the programmable interface must be re-programmed, requiring the circuitry that communicates with the dynamically reconfigurable circuitry to halt all communications (and potentially all operations), which is a time consuming and inefficient solution.

SUMMARY

Integrated circuits or other circuitry may include dynamically reconfigurable circuitry that is reconfigurable between at least first and second configurations during normal operation. A bridge circuit may be used to interface between the dynamically reconfigurable circuitry and dedicated circuitry or other circuitry having static configurations during normal operation of the device. The bridge circuit may include first and second interfaces and interface circuitry coupled between the first and second interfaces. The first interface may be coupled to dedicated circuitry, whereas the second interface may be coupled to the dynamically reconfigurable circuitry, which may provide variable communications requirements to the bridge circuit. Control circuitry may control and/or adjust the interface circuitry based on the variable communications requirements of the second interface without interrupting communications at the first interface. The bridge circuit may handle communications between the dedicated circuitry and the first and second configurations of the dynamically reconfigurable circuitry. The variable communications requirements may be dependent on which configuration of the dynamically reconfigurable circuitry is currently implemented.

The interface circuitry of the bridge circuit may include storage circuitry such as a buffer that stores transactions received at the first interface of the bridge circuit. The buffer may store transactions received at the first interface from the dedicated circuitry while the dynamically reconfigurable circuitry is performing reconfiguration operations. After completion of reconfiguration operations, the buffered transactions may be provided to the dynamically reconfigurable circuitry, thereby providing a seamless transition for the dedicated circuitry (e.g., without interrupting communications or other operations of the dedicated circuitry).

Each configuration of the dynamically reconfigurable circuitry may require a potentially different set of communications settings for the interface circuitry. The interface circuitry may include interface type (e.g., protocol) conversion circuitry, width conversion circuitry, address remapping circuitry, latency compensation circuitry, clock crossing circuitry, priority sorting circuitry, and/or other interface circuitry having communications settings that are controlled by the control circuitry to satisfy the communications requirements of the dynamically reconfigurable circuitry. The communications settings may be adjusted during normal operation of the bridge circuit.

Further features of the present invention, its nature and various advantages will be more apparent from the accompanying drawings and the following detailed description.

BRIEF DESCRIPTION OF THE DRAWINGS

FIG. 8 is a diagram of an illustrative address remap table that may be used by a bridge circuit to map addresses from a first address domain to a second address domain in accordance with an embodiment of the present invention.

DETAILED DESCRIPTION

Embodiments of the present invention relate to interface circuitry. The interface circuitry may interface between configurable (programmable) circuitry and dedicated circuitry on an integrated circuit. In some scenarios, the interface circuitry, configurable circuitry, and dedicated circuitry may form one or more integrated circuits. The integrated circuits may be digital signal processors, microprocessors, application specific integrated circuits, integrated circuit bridges, or other suitable integrated circuits.

Figure 1:
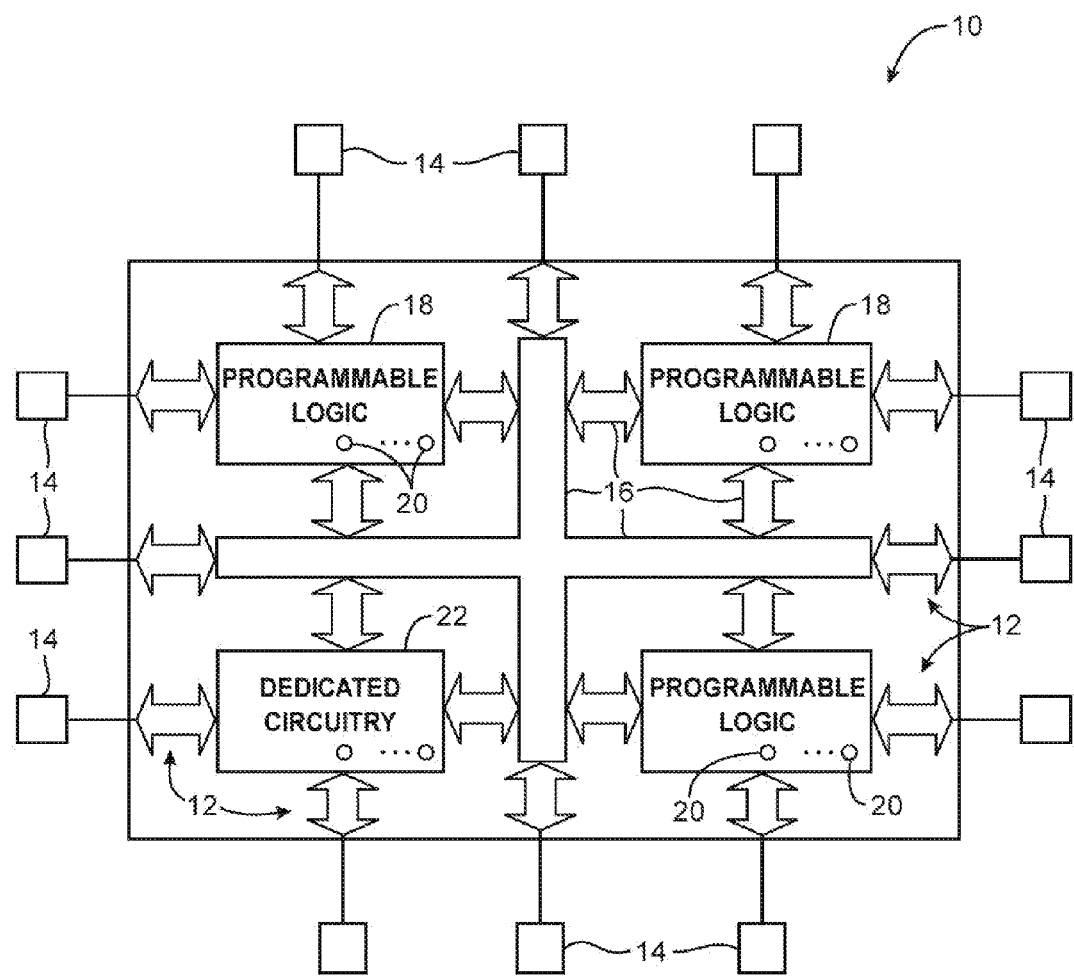
FIG. 1 is a diagram of an illustrative programmable integrated circuit having dedicated circuitry that communicates with programmable logic in accordance with an embodiment of the present invention.

As an example, an integrated circuit such as a programmable integrated circuit may include interface circuitry. This is merely illustrative and does not serve to limit the scope of the present invention. If desired, application specific integrated circuits, microprocessors, and other application specific products may contain interface circuitry. FIG. 1 is a diagram of an illustrative programmable integrated circuit device. As shown in FIG. 1, device 10 may have input-output (I/O) circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. For example, programmable logic 18 may include look-up tables, registers, and multiplexers. The programmable logic 18 may be configured to perform a custom logic function. The programmable interconnects associated with interconnection resources may be considered to be a part of programmable logic 18.

Programmable logic 18 contains programmable elements 20. Programmable elements 20 may be based on any suitable programmable technology, such as fuses, antifuses, electrically-programmable read-only-memory technology, random-access memory cells, mask-programmed elements, etc. As an example, programmable elements 20 may be formed from memory cells. During programming, configuration data is loaded into the memory cells using pins 14 and input-output circuitry 12. The memory cells are typically random-access-memory (RAM) cells. Because the RAM cells are loaded with configuration data, they are sometimes referred to as configuration RAM cells (CRAM).

Programmable element 20 may be used to provide a static control output signal for controlling the state of an associated logic component in programmable logic 18. The output signals generated by elements 20 are often applied to gates of metal-oxide-semiconductor (MOS) transistors (sometimes referred to as pass gate transistors). This example is merely illustrative. If desired, programmable elements 20 may be used to provide static output signals for configuring any desired circuitry on device 10.

The circuitry of device 10 may be organized using any suitable architecture. As an example, logic 18 of programmable device 10 may be organized in a series of rows and columns of larger programmable logic regions, each of which contains multiple smaller logic regions. The logic resources of device 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the logic of device 10 may be arranged in more levels or layers in which multiple large regions are interconnected to form still larger portions of logic. Other device arrangements may use logic that is not arranged in rows and columns.

Device 10 may include dedicated circuitry 22 that communicates with configurable circuitry such as programmable logic regions 18. Dedicated circuitry 22 may not be programmable (e.g., circuitry 22 may not include any programmable elements 20). Dedicated circuitry 22 may include circuitry such as central processing units, application-specific integrated circuitry, or other dedicated circuitry.

Dedicated circuitry 22 may use interconnects 16 in communicating with programmable logic regions 18. Interconnects 16 may, for example, be configured as a bus over which dedicated circuitry 22 and programmable logic regions 20 communicate using bus protocols. This example is merely illustrative. Dedicated circuitry 22 may communicate with programmable circuitry using any desired protocols or interconnects (e.g., programmable interconnects, dedicated interconnects, etc.).

Dedicated circuitry 22 is only capable of handling communications having predetermined attributes such as protocols and timing (e.g., because circuitry 22 is not reconfigurable). It can therefore be challenging for dedicated circuitry 22 to communicate with programmable circuitry on device 10. For example, programmable logic regions may be dynamically reconfigurable logic regions that can be programmed during normal operation of device 10. In this scenario, a programmable logic region that communicates with dedicated circuitry 22 may be reconfigured to perform different functionality or communicate using different protocols. Dedicated circuitry 22 may be unable to accommodate new configurations of the programmable logic region (e.g., because dedicated circuitry 22 is not reconfigurable and is only capable of handling a limited set of communications protocols for which it was designed).

Figure 2:
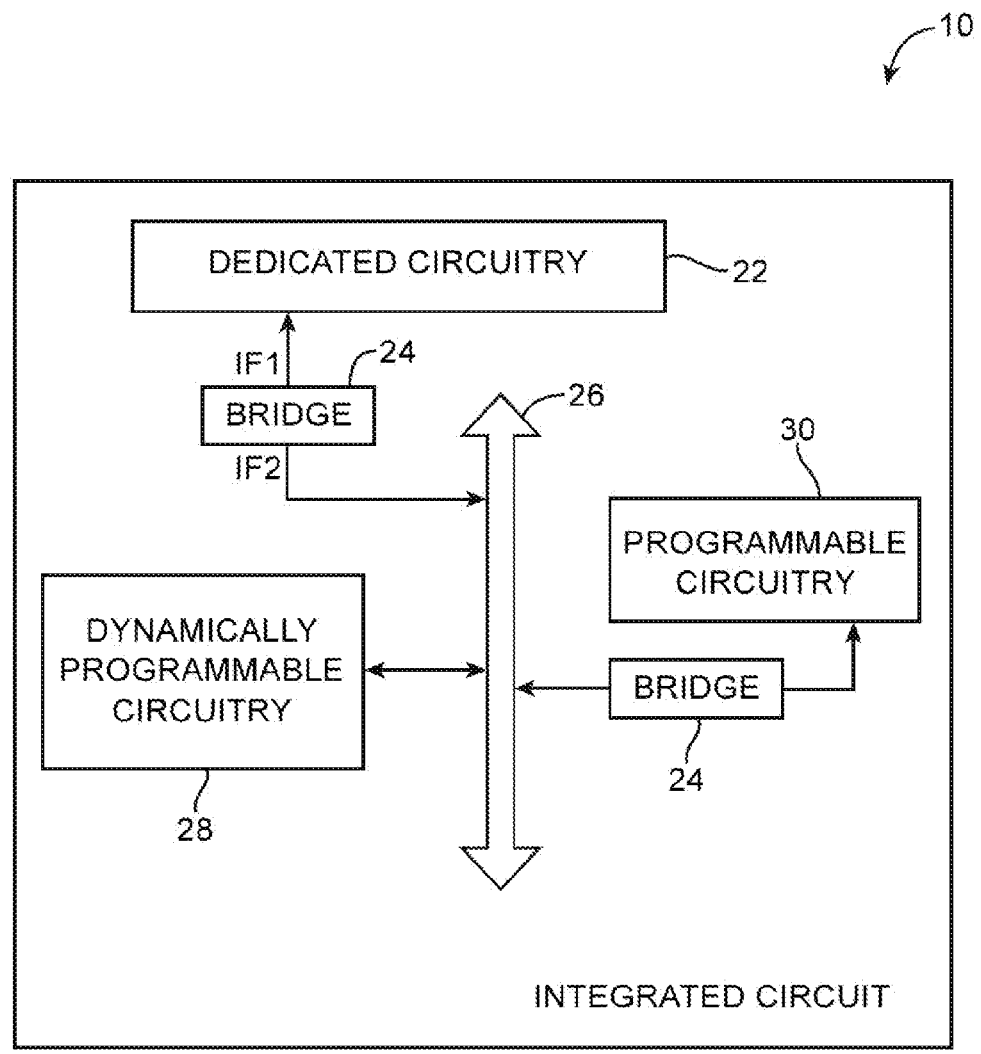
FIG. 2 is a diagram of an illustrative integrated circuit having bridge circuits that interface between dynamically reconfigurable circuitry and other circuitry in accordance with an embodiment of the present invention.

Dedicated circuitry such as circuitry 22 may be provided with bridge circuitry that accommodates communications having potentially variable attributes. FIG. 2 is an illustrative diagram of an integrated circuit 10 including dedicated circuitry 22 having a bridge circuit 24. In the example of FIG. 2, a bridge circuit 24 may interface between dedicated circuitry 22 and a communications bus 26. However, this example is merely illustrative. If desired, bridge circuit 24 may be used to interface between dedicated circuitry 22 and any desired circuitry. For example, the bridge circuit 24 may interface directly between dedicated circuitry 22 and a programmable circuit.

Bridge circuit 24 may be a dedicated circuit that is implemented separately or integrally with corresponding circuitry such as dedicated circuitry 22. For example, bridge circuit 24 may be formed as a part of dedicated circuitry 22 or may be coupled between dedicated circuitry 22 and interconnects 16 of FIG. 1.

Bus 26 may be coupled to multiple circuits that communicate over bus 26. In the example of FIG. 2, dedicated circuitry 22, programmable circuitry 30, and dynamically programmable circuitry 28 (i.e., dynamically reconfigurable circuitry) may communicate over bus 26. Dynamically reconfigurable circuitry such as circuit 28 that is coupled to bus 26 may be reconfigured with a new configuration during normal operation of device 10. The new configuration of circuit 28 may send and receive signals over bus 26 using a protocol and/or signal timing that is potentially incompatible with dedicated circuitry 22. For example, dedicated circuitry 22 may handle only a first communications protocol whereas the new configuration of circuit 28 may communicate using a second communications protocol that is incompatible with the first protocol. As another example, the new configuration of circuit 28 may produce bus control signals that are incompatible with the timing requirements of dedicated circuitry 22 (and vice versa).

Bridge 24 of dedicated circuitry 22 may include interfaces IF1 and IF2. Interface IF1 may handle communications with dedicated circuitry 22. Interface IF2 may handle communications over bus 26. Interface IF2 may be adjustable during normal operation of device 10 to accommodate communications having varying attributes from one or more sources. For example, interface IF2 may accommodate communications from multiple different configurations of dynamically programmable circuitry 28.

In some scenarios, it may be desirable to provide programmable circuitry such as circuitry 30 with a corresponding bridge 24. For example, programmable circuitry 30 may not be dynamically reconfigurable and therefore has a static configuration during normal operation of device 10. In this scenario, programmable circuitry 30 may be unable to handle communications from different configurations of dynamically programmable circuitry 28, because the configuration of programmable circuitry 30 is determined before normal operation of device 10 (e.g., programmable elements of circuitry 30 may be loaded with static control values prior to normal operation of device 10). Bridge 24 of programmable circuitry 30 may help accommodate communications between programmable circuitry 30 and dynamically programmable circuitry such as circuitry 28.

Figure 3:
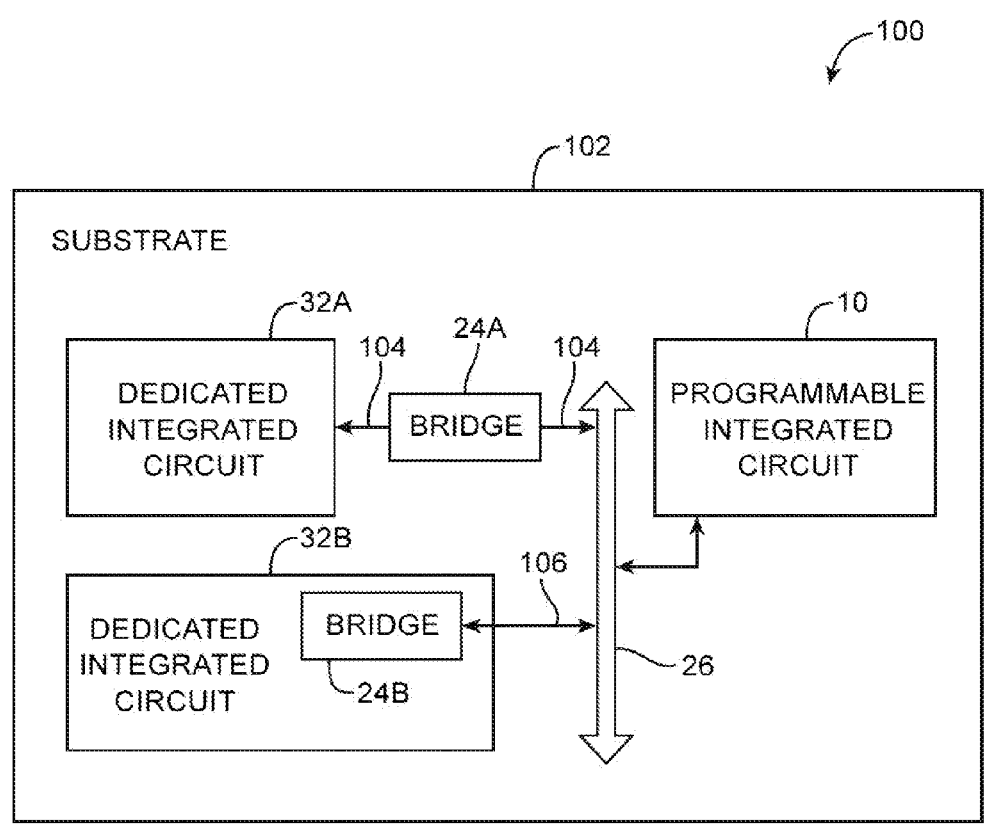
FIG. 3 is a diagram of an illustrative integrated circuit package having bridge circuits that interface between integrated circuits and a programmable integrated circuit that may be dynamically reconfigured in accordance with an embodiment of the present invention.

The example of FIG. 2 in which bridge circuit 24 is implemented for dedicated circuitry 22 on integrated circuit 10 is merely illustrative. FIG. 3 is an illustrative device 100 in which bridges 24A and 24B provide interfaces for dedicated integrated circuits 32A and 32B on a substrate 102. Device 100 may be a packaged device in which integrated circuits such as dedicated integrated circuit 32A, 32B, and 10 are mounted on substrate 102 (e.g., a package substrate, an interposer, or other substrate). This example is merely illustrative. If desired, device 100 may be a printed circuit assembly. In this scenario, substrate 102 may be a printed circuit board on which integrated circuits 32A, 32B, and 10 are mounted. The printed circuit board may be formed from materials such as laminates and resin (e.g., fiberglass-filled epoxy such as FR-4). The integrated circuits may form surface mount technology (SMT) components that are mounted to the printed circuit board. As examples, ball grid array packaging, pin grid array packaging, or other packaging technologies may be used to mount one or more integrated circuits to the printed circuit board.

Bridge circuits may be formed separately or integrally with corresponding integrated circuits. Bridge 24A may be formed as an integrated circuit that is mounted to substrate 102. Bridge 24A may be electrically coupled to dedicated integrated circuit 32A and bus 26 via interconnects 104. Bridge 24B may be formed integrally with dedicated integrated circuit 32B (e.g., bridge 24B may be formed as a portion of integrated circuit 32B). One or more interconnects 106 may electrically couple bridge 24B to bus 26.

Figure 4:
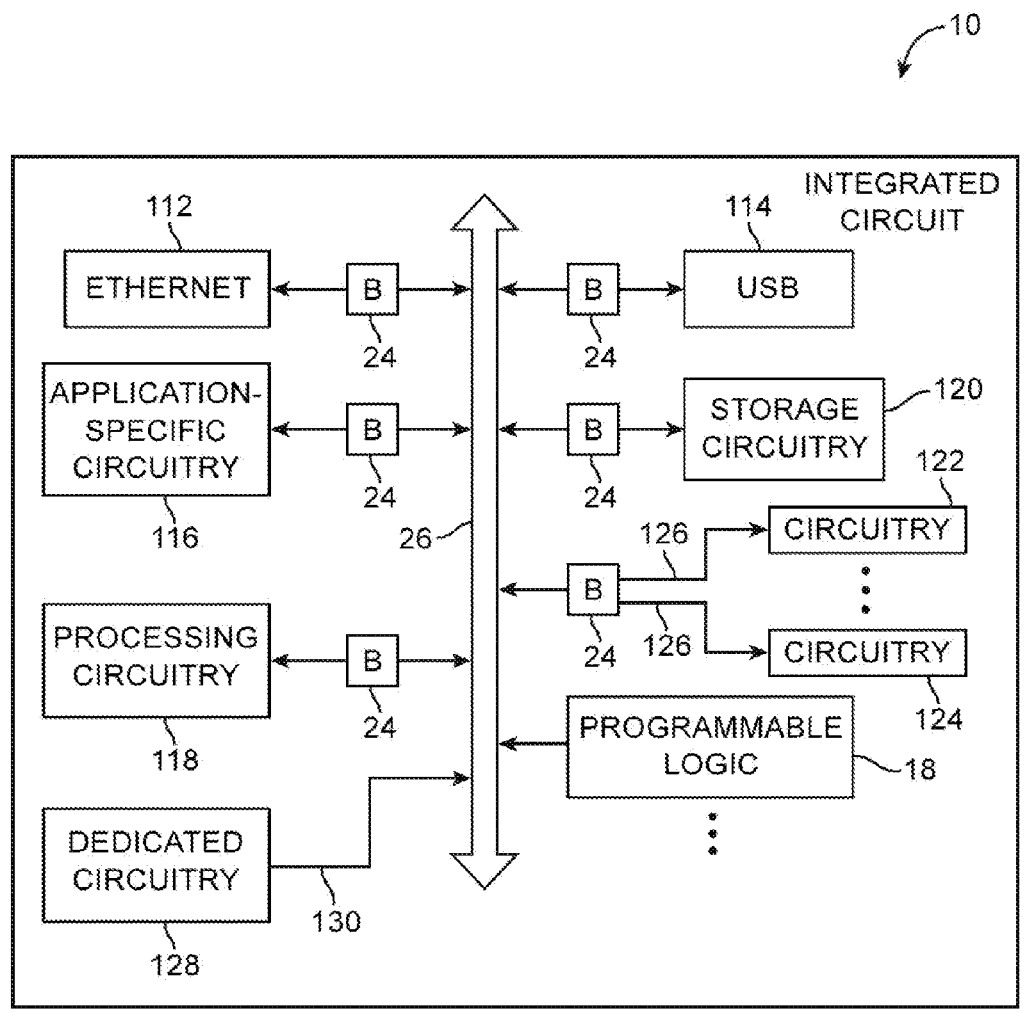
FIG. 4 is a diagram of an illustrative integrated circuit having multiple bridge circuits coupled to various respective circuitry for interfacing with dynamically reconfigurable circuitry in accordance with an embodiment of the present invention.

Any desired circuitry that communicates with dynamically programmable circuitry may be provided with bridge circuitry. FIG. 4 is an illustrative diagram in which dedicated circuits that perform various functions on an integrated circuit 10 may be provided with bridge circuits 24. As shown in FIG. 4, multiple dedicated circuits such as Ethernet circuitry 112, Universal Serial Bus (USB) circuitry 114, application-specific circuitry 116, processing circuitry 118 (e.g., application-specific processing circuits, general-purpose processing units such as central processing units, etc.), storage circuitry 120 (e.g., volatile and/or non-volatile memory such as random-access memory). The dedicated circuitry may communicate over bus 26 using predetermined protocols and/or signal timing. In other words, attributes of communications signals received by the dedicated circuits are required to satisfy predetermined requirements of the dedicated circuitry. Each dedicated circuit may potentially have different or similar communications requirements.

Each dedicated circuit may be provided with a corresponding bridge circuit 24. The bridge circuit of a given dedicated circuit may be adjustable to handle communications over bus 26 having any desired attributes. Communications received by a bridge circuit from bus 26 may be modified by the bridge circuit to satisfy the communications requirements of the corresponding dedicated circuit. The bridge circuit may similarly modify communications received from the corresponding dedicated circuit to satisfy requirements of the communications bus (e.g., protocol and/or timing requirements).

If desired, a single bridge circuit may accommodate communications with multiple dedicated circuits. For example, dedicated circuits 122 and 124 may each be coupled to bus 26 via a corresponding bridge circuit 24. Dedicated circuits 122 and 124 may be any desired circuits (e.g., I/O circuits, processing circuits, storage circuits, etc.). Dedicated circuits 122 and 124 may be coupled to the corresponding bridge circuit 24 via interconnects 126.

It may be not be necessary to provide bridge circuits to each dedicated circuit that is coupled to bus 26. For example, dedicated circuitry 128 may not communicate with dynamically programmable circuitry such as programmable logic 18. In other words, dedicated circuitry 128 may never send or receive communications to programmable logic 18. In this scenario, bridge circuit 24 may be omitted for dedicated circuitry 128 so that dedicated circuitry 128 is directly connected to bus 26. Providing bridge circuits only for dedicated circuits that communicate with dynamically programmable circuitry may help to reduce complexity and cost.

The example of FIG. 4 in which multiple dedicated circuits with respective bridge circuits are formed on an integrated circuit is merely illustrative. If desired, dedicated circuits each having bridge circuits may be formed on a package substrate or a printed circuit board (e.g., as shown in FIG. 3).

Figure 5:
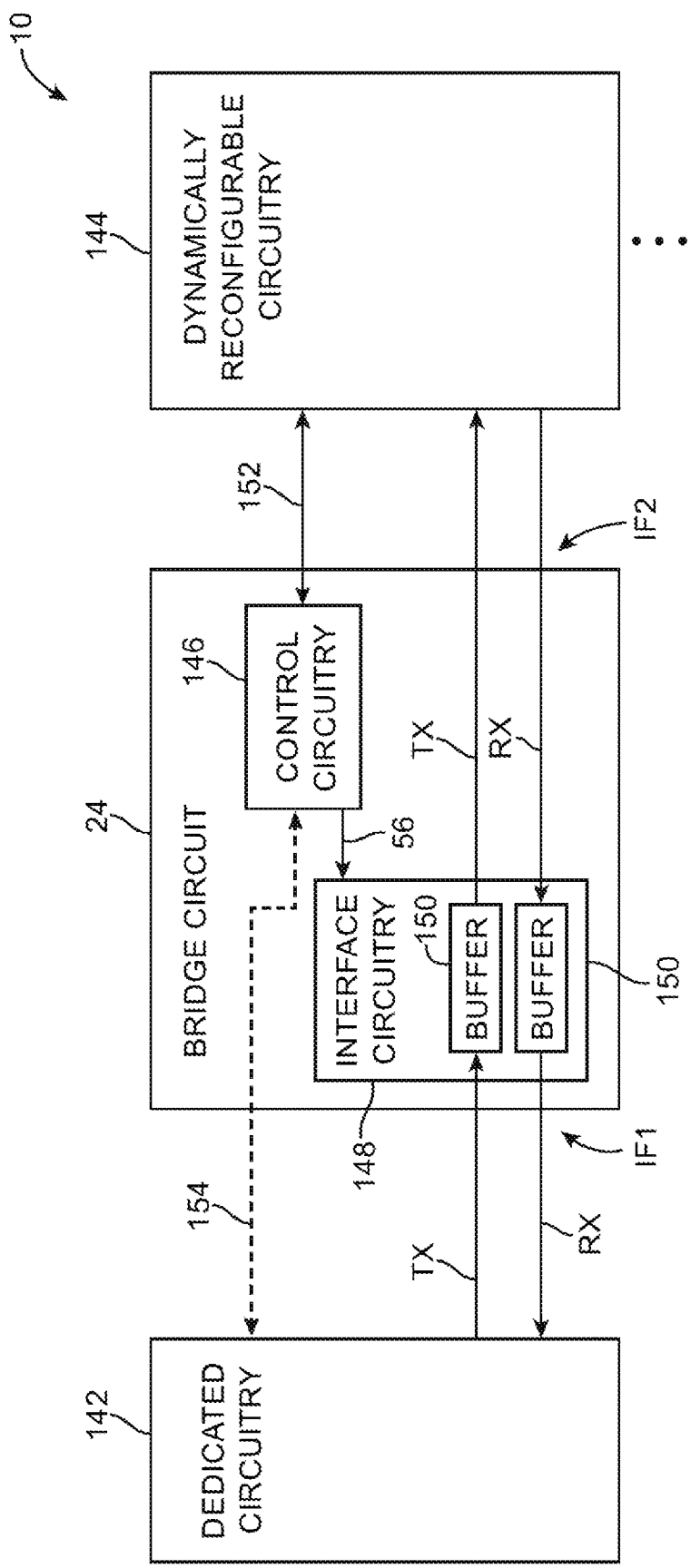
FIG. 5 is a diagram of an illustrative integrated circuit having a bridge circuit with interface circuitry that is controlled by control circuitry to handle communications between dynamically reconfigurable circuitry and dedicated circuitry in accordance with an embodiment of the present invention.

FIG. 5 is an illustrative diagram of a bridge circuit 24 that is interposed between circuitry 142 and dynamically reconfigurable circuitry 144. Bridge circuit 24 may include interfaces IF1 and IF2. Interface IF1 may have control and data paths that are coupled between dedicated circuitry 142 and bridge circuit 24, whereas interface IF2 may have control and data paths that are coupled between dynamically reconfigurable circuitry 144 and bridge circuit 24. In the example of FIG. 5, circuitry 142 may be dedicated circuitry. However, this example is merely illustrative. Circuitry 142 may any circuitry that has a static configuration during normal operation of device 10 (e.g., circuitry 142 may be dedicated circuitry, programmable circuitry that is not dynamically reconfigurable, etc.).

As shown in FIG. 5, bridge circuit 24 may include control circuitry 146 and interface circuitry 148. Interface circuitry 148 may provide transmit path TX and receive path RX between dedicated circuitry 142 and dynamically reconfigurable circuitry 144. Each path may include a respective buffer 150 that is used to store communications (e.g., transactions) between dedicated circuitry 142 and dynamically reconfigurable circuitry 144. For example, buffer 150 of transmit path TX may store information sent from dedicated circuitry 142 to dynamically configurable circuitry 144, whereas buffer 150 of receive path RX may store information sent from dynamically reconfigurable circuitry 144 to dedicated circuitry 142.

Interface circuitry 148 may interface between potentially disparate communications requirements of dedicated circuitry 142 and dynamically reconfigurable circuitry 144. For example, interface circuitry 148 may provide and receive information from dedicated circuitry 142 using a first interface IF1 having predetermined communications attributes associated with dedicated circuitry 142 (e.g., protocol and/or timing settings). Interface circuitry 148 may buffer information received from dedicated circuitry 142 over receive path RX using the corresponding buffer 150. Interface circuitry 148 may transmit the buffered information using data and/or control signals over transmit path TX while satisfying communications requirements of interface IF2. Similarly, information received from dynamically reconfigurable circuitry 144 at interface IF2 may be buffered and transmitted from interface IF1 using signals that satisfy communications requirements of interface IF1. The communications requirements of interface IF2 may change during normal operation of device 10 due to dynamic reconfiguration of circuitry 144 and may therefore be referred to as variable communications requirements.

Control circuitry 146 may control interface circuitry 148 to accommodate communications requirements of dedicated circuitry 142 and dynamically reconfigurable circuitry 144. Control circuitry 146 may control interface circuitry 148 by providing control signals via control paths 156 that adjust communications settings of the interface circuitry. Consider the scenario in which dynamically reconfigurable circuitry 144 is reconfigured during normal operation of device 10. In this scenario, the new configuration of dynamically reconfigurable circuitry 144 may be associated with a new set of communications requirements that is incompatible with the current settings of interface IF2. The new set of communications requirements may be conveyed to bridge circuit 24 over interface IF2 (e.g., over control paths 152). Control circuitry 146 may subsequently adjust interface circuitry 148 to satisfy the updated requirements for interface IF2.

If desired, dedicated circuitry 142 may provide communications requirements for interface IF1 and/or interface IF2. For example, dedicated circuitry 142 may control the configuration of dynamically reconfigurable circuitry. In this scenario, dedicated circuitry 142 may convey updated requirements of dynamically reconfigurable circuitry 144 to bridge circuit 24 for use in adjusting the settings of interface IF2. This example is merely illustrative. The dynamically reconfigurable circuitry may convey the updated requirements to bridge circuit 24 (e.g., subsequent to reconfiguration operations).

Transmit path TX, receive path RX, and control paths such as paths 152 and 154 may be formed as separate interconnects or may share interconnects. For example, a first set of one or more interconnects may form transmit path TX between dedicated circuitry 142 and bridge 24, whereas a second set of one or more interconnects may form receive path RX between circuitry 142 and bridge 24. As another example, a set of one or more interconnects may be shared to form transmit and receive paths between dedicated circuitry 142 and bridge circuit 24. Control signals including information such as communications requirements may be conveyed over control paths such as paths 152 and 154 or may be conveyed over transmit and receive paths (e.g., control paths 152 and/or 154 may be omitted). If desired, a set of one or more interconnects may form a bus to which interface IF2 is coupled (e.g., bus 26 of FIG. 2, FIG. 3, or FIG. 4).

Figure 6:
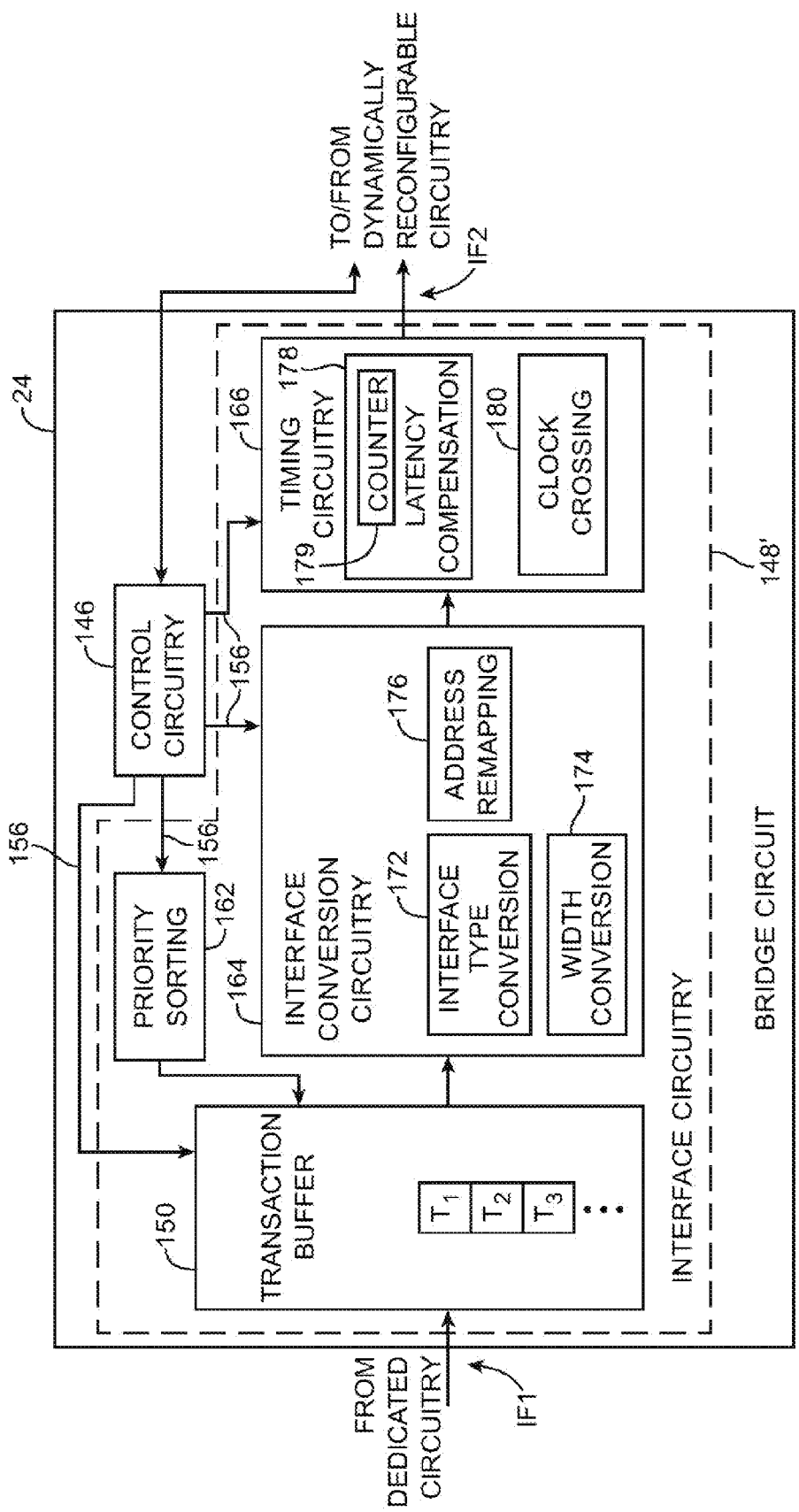
FIG. 6 is a diagram of an illustrative bridge circuit having interface circuitry and control circuitry in accordance with an embodiment of the present invention.

FIG. 6 is an illustrative diagram of a bridge circuit 24 having interface circuitry that is adjustable during normal operation to accommodate transmission of information from dedicated circuitry such as circuitry 142 of FIG. 5 to dynamically reconfigurable circuitry such as circuitry 144. FIG. 6 may, for example, represent circuitry associated with transmit path TX of FIG. 5. As shown in FIG. 6, bridge circuit 24 may include interface circuitry 148'. Interface circuitry 148' may include buffer 150, priority sorting circuitry 162, interface conversion circuitry 164, and timing circuitry 166.

Information received from the dedicated circuitry may be partitioned into transactions. For example, bus transactions received from the dedicated circuitry may each include transaction data. Each transaction may be stored by buffer 150. For example, transactions T1, T2, and T3 received from the dedicated circuitry may be stored in transaction buffer 150. If desired, only transaction data for each transaction may be stored in transaction buffer 150. Buffer 150 that stores transaction data may be sometimes referred to herein as a transaction buffer.

Transaction buffer 150 may be implemented as a first-in-first-out (FIFO) buffer, a sortable buffer, one or more queues, linked lists, or any desired storage structure. If desired, entries associated with transactions in transaction buffer 150 may be assigned priority information that is used in determining the order of processing for the transactions.

Priority sorting circuitry 162 may serve to determine the order in which transactions stored in buffer 150 are processed and removed from the buffer. For example, circuitry 162 may sort or otherwise rearrange the entries in transaction buffer 150 based on priority information associated with each of the entries. The priority information of each entry may, if desired, be assigned based on control signals received from control circuitry 146 via control path 152.

Interface conversion circuitry 164 may include interface type conversion circuitry 172, width conversion circuitry 174, and address remapping circuitry 176. Interface conversion circuitry 164 may receive control signals from control circuitry 146. Interface type conversion circuitry 172 may convert between interface types (e.g., interface protocols). As an example, interface IF2 may be adjustable between parallel and serial bus types. In this scenario, interface type conversion circuitry 172 may include serial-to-parallel and/or parallel-to-serial circuitry that is dynamically adjustable to convert data received at interface IF1 using a first protocol for the interface protocol type of interface IF2. This example is merely illustrative. Interface type conversion circuitry 174 may modify transactions received at interface IF1 with any desired information for interface IF2. For example, interface type conversion circuitry 174 may modify transactions to include coherency attributes, security attributes, privilege attributes, or any desired attributes. Coherency attributes may include identifiers such as flags that help to ensure coherency of transaction data between circuitry coupled to interface IF1 and/or devices coupled to interface IF2 (e.g., that data stored at different circuits is consistent). Security attributes may include tags or identifiers that help to ensure that transactions are securely transmitted from interface IF2 to circuitry coupled to interface IF2.

Interfaces IF1 and IF2 may have be characterized by respective widths corresponding to how many bits of data can be conveyed at any given time or for any given transaction over the interfaces. For example, interface IF1 may have a width corresponding to how many interconnects are coupled in parallel between the dedicated circuitry and interface IF1. As another example, interface IF1 may have a width corresponding to how many bits of data are transferred for one transaction. In scenarios in which interfaces IF1 and/or IF2 are coupled to corresponding buses, the width of each interface may match the width of the corresponding bus (sometimes referred to as bus width). Interfaces and buses may have any desired width. For example, interface IF1 may have a width of eight bits, 16 bits, 32 bits, 64 bits, or any desired width.

Width conversion circuitry 174 may serve to accommodate differences in bus width. Consider the scenario in which the dedicated circuitry provides transaction data having a width of 32 bits, whereas the dynamically reconfigurable circuitry expects to receive transaction data having a width of 8 bits. In this scenario, width conversion circuitry 174 may convert 32-bit transaction data received at interface IF1 into 8-bit transaction data for transmission at interface IF2. Width conversion circuitry 174 may convert the width of transaction data received at interface IF1 to the width of interface IF2 while ensuring that the converted transaction data satisfies address alignment requirements of interface IF2 (e.g., big-endian address alignment, little-endian address alignment, etc.).

As an example, width conversion circuitry 174 may partition transaction data received from interface IF1 into portions each having the width of interface IF2. A multiplexer may receive each portion of the transaction data. The multiplexer may be controlled by a state machine that determines the order in which each portion of the transaction data is provided at interface IF2 (e.g., most significant byte first for big-endian address alignment and least significant byte first for little-endian address alignment).

Each communications transaction between the dedicated circuitry and bridge circuit 24 may include transaction data and corresponding address information. Bridge circuit 24 may receive address information from the dedicated circuitry at interface IF1. The address information may be received via dedicated address interconnects of interface IF1, or may be received via interconnects that are shared with data signals. The address information may indicate how the dynamically reconfigurable circuitry should process the transaction data. For example, the address information may identify an address of the dynamically reconfigurable circuitry at which the transaction data should be stored. However, in some scenarios, the address information provided by the dedicated circuitry may be mismatched with the desired address information for the dynamically reconfigurable circuitry.

As an example, the dynamically reconfigurable circuitry may be dynamically reconfigured from using a first address space (e.g., a range of acceptable addresses to which transaction data may be addressed) to a second, different address space. In this scenario, the dedicated circuitry may continue to provide addresses of the first address space that are now mismatched with the address space of the dynamically reconfigurable circuitry (i.e., the second address space).

Address remapping circuitry 176 may remap addresses received from the dedicated circuitry to the address space associated with the dynamically reconfigurable circuitry. Address remapping circuitry 176 may include an address remap table having entries that map addresses of a first address space associated with the dedicated circuitry to addresses of a second address space associated with the dynamically reconfigurable circuitry. Circuitry 176 may perform look-up operations on the table to identify addresses of the second address space that correspond to addresses provided by the dedicated circuitry.

Interface IF2 may be subject to timing requirements and/or constraints that are associated with the dynamically reconfigurable circuitry. The timing requirements may be used in determining when control and data signals at interface IF2 are asserted and de-asserted by bridge circuit 24. The timing requirements may include latency requirements and clock requirements. Timing circuitry 166 may include latency compensation circuitry 178 and clock crossing circuitry 180 that serve to satisfy timing requirements of interface IF2.

Latency compensation circuitry 178 may include delay circuitry such as counter and buffer circuitry for adjusting the timing of data signals and control signals such as ready/valid signals. The buffer circuitry may serve to temporarily store data for a duration determined by a value stored in the counter (e.g., a value provided by control circuitry 146 that corresponds to how long the data should be held constant).

Interfaces IF1 and IF2 may operate using respective clock signals. The clock signals may have corresponding clock frequencies and clock phases. The clock signal of interface IF1 may correspond to the dedicated circuitry (e.g., the clock signal of interface IF1 may be used to operate the dedicated circuitry), whereas the clock signal of interface IF2 may correspond to the dynamically reconfigurable circuitry. The clock signals of interfaces IF1 and IF2 may be synchronous clock signals in which one of the clock signals is an integer multiple of the other clock signal. This example is merely illustrative and the relationship between the clock signals of interfaces IF1 and IF2 may depend on the configuration of the dynamically reconfigurable circuitry. For example, the clock signals may be pseudo-synchronous, in which one of the clock signals is a known ratio of the other. As another example, the clock signals may be asynchronous, in which the relationship between each clock signals is unknown. Clock crossing circuitry 180 may include synchronous clock crossing circuitry, pseudo-synchronous clock crossing circuitry, and/or asynchronous clock crossing circuitry for handling each possible relationship between the clock signals of interfaces IF1 and IF2. Control circuitry 146 may provide control signals via control paths 156 that enable selected portions of the clock crossing circuitry.

Figure 7:
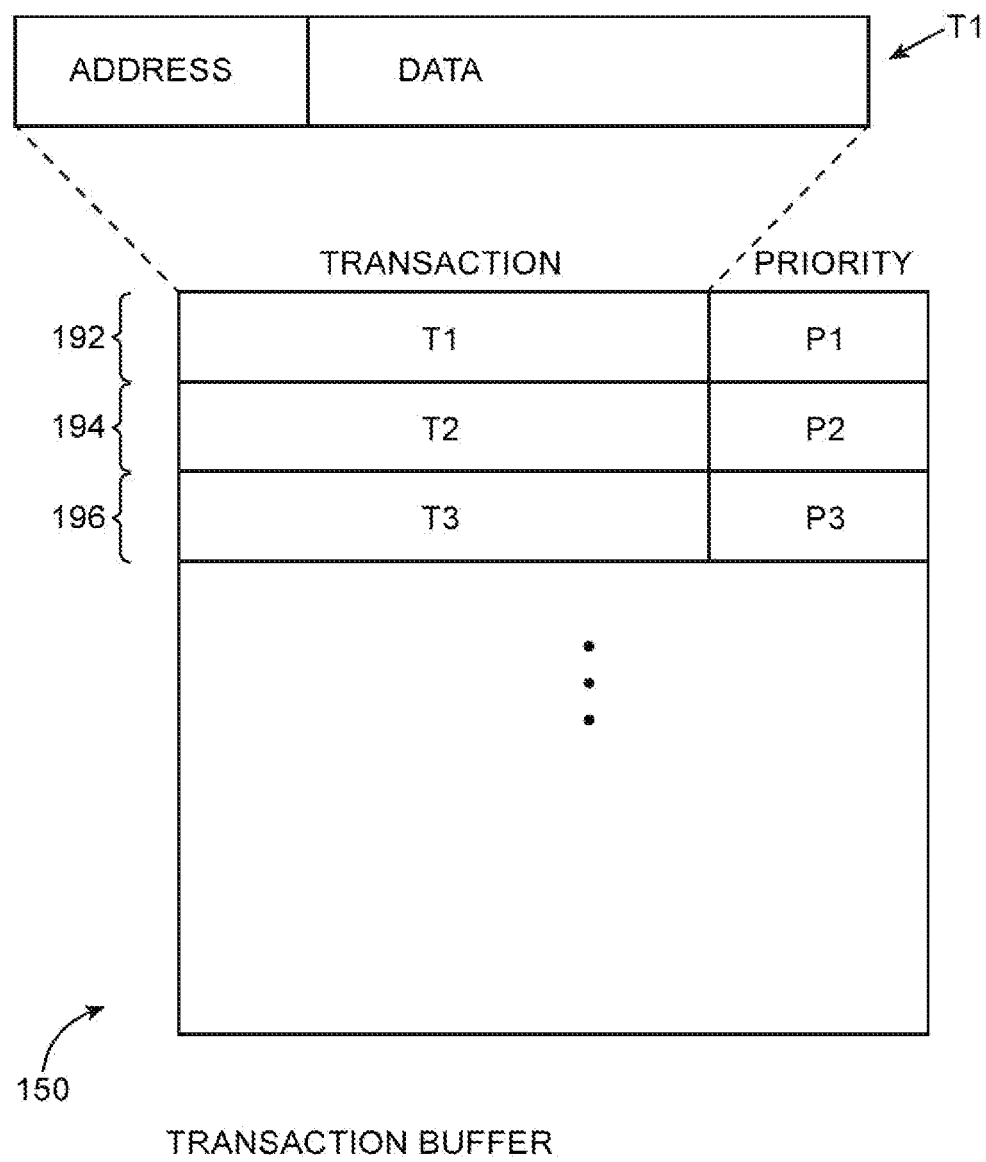
FIG. 7 is a diagram of an illustrative transaction buffer that may be used by a bridge circuit to store communications received at an interface in accordance with an embodiment of the present invention.

Storage circuitry such as transaction buffer 150 may be implemented as a table, database, or any desired storage structure. FIG. 7 is a diagram of an illustrative transaction buffer 150 including entries corresponding to respective transactions that have been received and stored in the transaction buffer. As shown in FIG. 7, each entry of the transaction buffer may include a transaction having a corresponding priority. Transaction buffer entry 192 may include transaction T1 having a priority P1, whereas entry 194 may include transaction T2 having priority P2 and entry 196 may include transaction T3 having priority P3. The transaction buffer may be sorted in order of priority (e.g., by priority sorting circuitry 162 of FIG. 6). In other words, the transaction buffer may be arranged so that higher priority transactions are processed before lower priority transactions. In the example of FIG. 7, priority P1 may be higher than priority P2, whereas priority P2 may be higher than priority P3. Each transaction such as transaction T1 stored in transaction buffer 150 may include address information and data information.

The example of FIG. 7 in which priority information is stored in transaction buffer 150 is merely illustrative. If desired, priority information may be omitted from transaction buffer 150. In this scenario, the priority of each transaction may be implicit in the order of entries of the transaction buffer (e.g., priority sorting circuitry 162 may assign an implicit priority to each transaction by reordering the entries of transaction buffer 150).

Transactions stored in transaction buffer 150 may be retrieved by bridge circuit 24 and processed using interface conversion circuitry 164 to format the transactions appropriately for the communications requirements of interface IF2. The address information stored in the transaction buffer may be remapped by address remapping circuitry 176 using address remap table 202 of FIG. 8.

As shown in FIG. 8, address remap table 202 may include entries such as entries 204, 206, and 208. Each address remap table entry may include an address of interface IF1 and a corresponding address of interface IF2. For example, entry 204 includes address ADRD1 of interface IF1 and address ADRP1 of interface IF2, whereas entry 206 includes addresses ADRD2 and ADRP2 of respective interfaces IF1 and IF2 and entry 208 includes addresses ADRD3 and ADRP3 of respective interfaces IF1 and IF2.

Consider the scenario in which transaction T1 of FIG. 7 includes address ADRD2. In this scenario, entry 192 of transaction T1 may be retrieved from transaction buffer 150 and processed by bridge circuit 24. Address remapping circuitry 176 may perform a table look-up operation in address remap table 202 for address ADRD2, which returns entry 206 (e.g., address remapping circuitry 176 may search table 202 to determine which entry includes address ADRD2 of interface IF2). Entry 206 identifies that address ADRD2 of transaction T1 should be mapped (e.g., replaced) with address ADRP2 for communications at interface IF2. The data retrieved from transaction buffer 150 may be subsequently transmitted at interface IF2 along with address ADRP2.

Control circuitry 146 may add, delete, or modify entries of address remap table 202 to satisfy communications requirements of dynamically reconfigurable circuitry that is coupled to interface IF2. In response to a new configuration of the dynamically reconfigurable circuitry, the control circuitry may update the mapping of address remap table 202 so that transactions received at interface IF1 are mapped to correct addresses at interface IF2.

Communications at interfaces such as interface IF1 and IF2 may require control and/or data signals that are conveyed through the interfaces at appropriate times. As an example, interface IF2 of bridge circuit 24 may communicate with dynamically reconfigurable circuitry that requires a predetermined sequence of control and data signals to be asserted at interface IF2 for each transaction. The sequence of signals may sometimes be referred to as a handshake between bridge circuit 24 and the dynamically reconfigurable circuitry.

Figure 9:
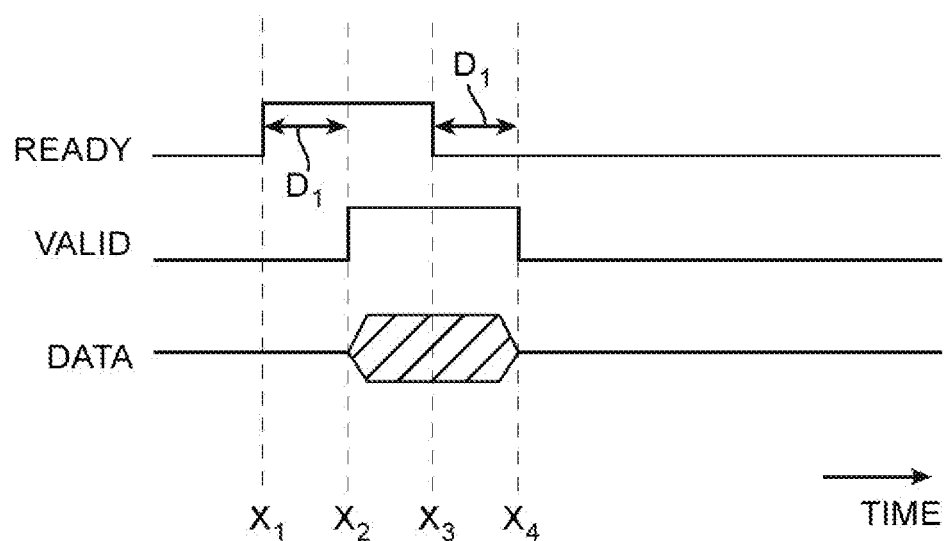
FIG. 9 is an illustrative timing diagram showing how communications at an interface of a bridge circuit may be subject to latency requirements in accordance with an embodiment of the present invention.

FIG. 9 is an illustrative timing diagram of handshake operations that may be performed over interface IF2 of bridge circuit 24 to process a transaction. As shown in FIG. 9, the handshake operations may involve control signals such as ready and valid signals. The ready signal may be controlled by dynamically reconfigurable circuitry that receives data from bridge circuit 24, whereas the valid and data signals may be controlled by bridge circuit 24. For example, the ready and valid signals may be asserted by setting the signals to logic one, whereas the signals may be de-asserted by setting the signals to logic zero.

At time X1, the dynamically reconfigurable circuitry may assert the ready signal, thereby indicating that the reconfigurable circuitry is prepared to accept data from bridge circuit 24. However, the reconfigurable circuitry may additionally require a delay D1 between assertion of the ready signal and data transmission (sometimes referred to as a ready/valid delay). Bridge circuit 24 may delay data transmission from the assertion of the ready signal by ready/valid delay D1 until time X2. At time X2, bridge circuit 24 may provide data at interface IF2 while simultaneously asserting the valid signal (e.g., the valid signal may indicate to the dynamically reconfigurable circuitry that the data provided by bridge circuit 24 on data paths is valid). At subsequent time X3, the dynamically reconfigurable circuitry may de-assert the ready signal, indicating that the reconfigurable circuitry will no longer be accepting data from bridge circuit 24. To accommodate latency requirements, bridge circuit 24 may continue to provide data for ready/valid delay D1 after the de-assertion of the ready signal (i.e., until time X4).

The example of FIG. 9 in which handshake operations use ready and valid control signals is merely illustrative. If desired, any control signals may be used in communications between bridge circuit 24 and circuitry that is coupled to interfaces of bridge circuit 24. The control signals may be subject to latency requirements that are determined by the configuration of the dynamically reconfiguration circuitry (e.g., each configuration may have a different set of one or more latency requirements).

Figure 10:
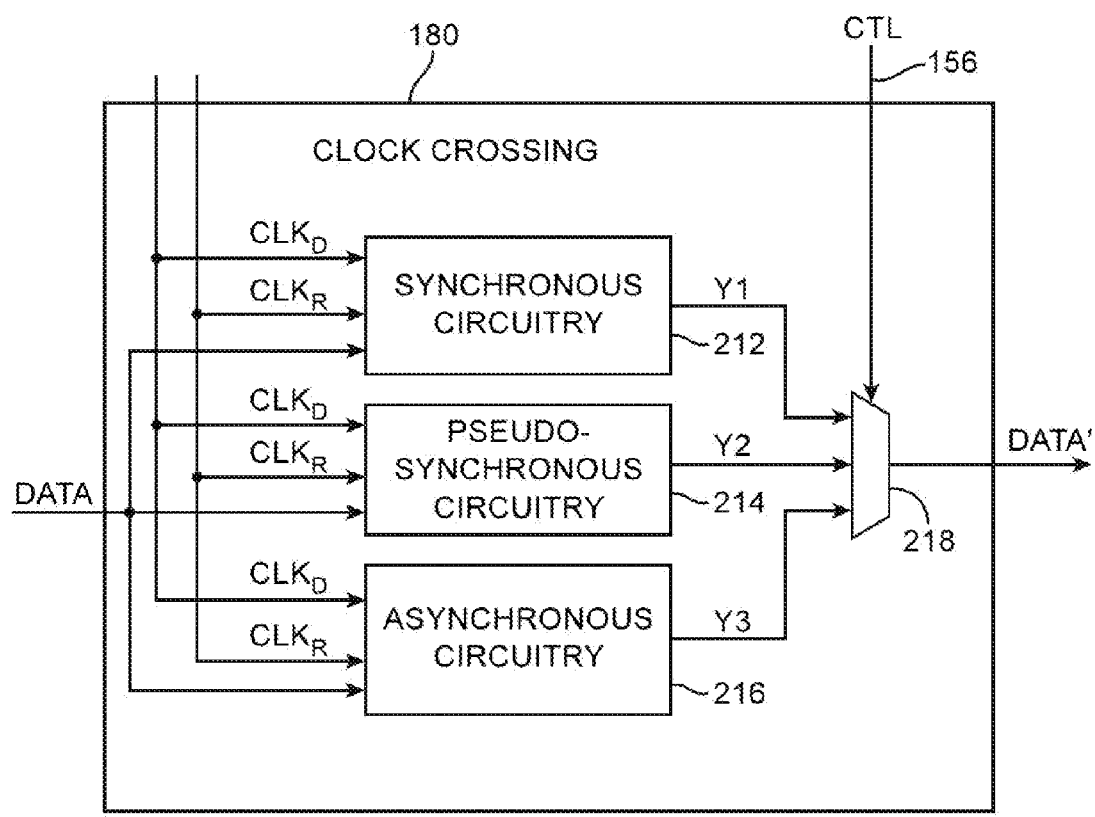
FIG. 10 is a diagram of clock crossing circuitry that may be used to handle bridging of clock domains in accordance with an embodiment of the present invention.

Each interface of bridge circuit 24 may have an associated clock signal. The clock signal of a given interface may be used in transmitting and/or receiving signals at that interface. The clock signal may be generated at device 10 using clock generation circuitry or may be received by device 10 via the interface (e.g., the clock signal may be generated by external clock circuitry). The clock signals of the interfaces may potentially be mismatched in frequency and/or phase, which can potentially cause communications errors. FIG. 10 is an illustrative diagram of clock crossing circuitry 180 that may be used to synchronize communications between interfaces that are associated with different clock signals. In the example of FIG. 10, clock signal CLKD may be associated with interface IF1 (e.g., clock signal CLKD may be used to receive signals from dedicated circuitry that is coupled to bridge circuit 24 at interface IF1), whereas clock signal CLKR may be associated with interface IF2.

As shown in FIG. 10, clock crossing circuitry may include synchronous clock crossing circuitry 212, pseudo-synchronous clock crossing circuitry 214, and asynchronous clock crossing circuitry 216. Circuitry 212, 214, and 216 may receive clock signals CLKD and CLKR and data (e.g., transaction data that has been retrieved from transaction buffer and processed by interface conversion circuitry 164).

Synchronous circuitry 212 may handle clock crossing in synchronous scenarios in which the frequency of one of clock signals CLKD and CLKR is an integer multiple of the frequency of the other. For example, clock signal CLKD may operate at a first frequency whereas clock signal CLKR may operate at a second frequency that is equal to an integer N times the first frequency (or vice versa). Synchronous circuitry 212 may include a register that is clocked by clock signal CLKR. The register may receive the data signal and produce output signal Y1 based on clock signal CLKR.

Pseudo-synchronous circuitry 214 may handle clock crossing in scenarios in which the frequency of one of clock signals CLKD and CLKR is a known ratio of the other. For example, pseudo-synchronous circuitry 214 may include a synchronizer circuit. The synchronizer circuit may include multiple flip-flops that are coupled in series (e.g., the output of each flip-flop is coupled to the input of a successive flip-flop). A first flip-flop of the series may receive DATA and may be clocked using the clock frequency of interface IF1 (e.g., the frequency of CLKD), whereas at least two of the remaining flip-flops of the series may be clocked using the clock frequency of interface IF2 (e.g., the frequency of CLKR).

Asynchronous clock crossing circuitry 216 may handle clock crossing in scenarios in which the relationship between clock signals CLKD and CLKR is either unknown or otherwise cannot be handled by pseudo-synchronous circuitry 214. Asynchronous clock crossing circuitry 216 may, for example, include an asynchronous first-in-first-out buffer. In this scenario, data may be stored using clock signal CLKD corresponding to interface IF1, whereas the stored data may be retrieved and output as data Y3 using clock signal CLKR corresponding to interface IF2.

Clock crossing circuitry 180 may include multiplexer 218 that receives data Y1, Y2, and Y3 from the synchronous, pseudo-synchronous, and asynchronous clock crossing circuitry. Multiplexer 218 may receive a control signal CTL via path 156 (e.g., from control circuitry 146 of FIG. 6) that is used in selecting which data is provided as output DATA'. For example, in a scenario in which the relationship between the clock signals of interfaces IF1 and IF2 is synchronous, control signal CTL may control multiplexer 218 to select data Y1 from synchronous clock crossing circuitry 212. Similarly, for pseudo-synchronous and asynchronous relationships, control signal CTL may control multiplexer 218 to select data Y2 and Y3, respectively.

Figure 11:
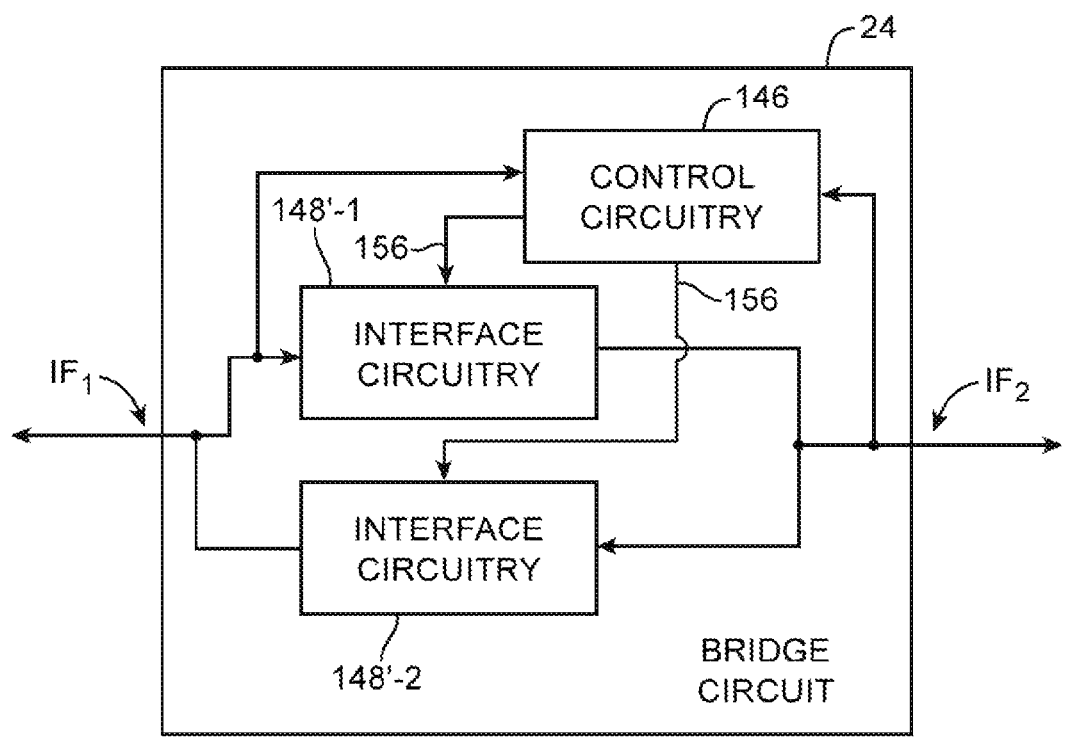
FIG. 11 is a diagram of an illustrative bridge circuit that may include multiple interface circuits for bidirectional communications between first and second interfaces in accordance with an embodiment of the present invention.

Bridge circuit 24 may be used to accommodate one-way (unidirectional) or two-way (bidirectional) communications between each pair of interfaces of the bridge circuit. In the example of FIG. 6, bridge circuit 24 is provided with a single interface circuitry 148' that accommodates transmissions from interface IF1 to interface IF2 (e.g., one-way communications from interface IF1 to interface IF2). As shown in FIG. 11, bridge circuit 24 may handle bidirectional communications using separate interface circuitry for each communications direction. Interface circuitry 148'-1 may be substantially similar to interface circuitry 148' of FIG. 6 and accommodate transmissions from interface IF1 to interface IF2. Interface circuitry 148'-2 may be arranged in the reverse direction of interface circuitry 148'-1 to accommodate transmissions from interface IF2 to IF1 (e.g., interface circuitry 148'-2 may be substantially similar to interface circuitry 148' of FIG. 6 with interfaces IF1 and IF2 reversed).

In the example of FIG. 11, control circuitry 146 may receive control information such as communications requirements, constraints, or settings (e.g., over interfaces IF1 and IF2). The control information may be used to control interface circuitry 148'-1 and 148'-2. However, this example is merely illustrative. If desired, each interface circuitry may be provided with respective control circuitry. For example, interface circuitry 148'-1 may be provided with a first control circuitry that is coupled to interface IF2, whereas interface circuitry 148'-2 may be provided with a second control circuitry that is coupled to interface IF1.

Figure 12:
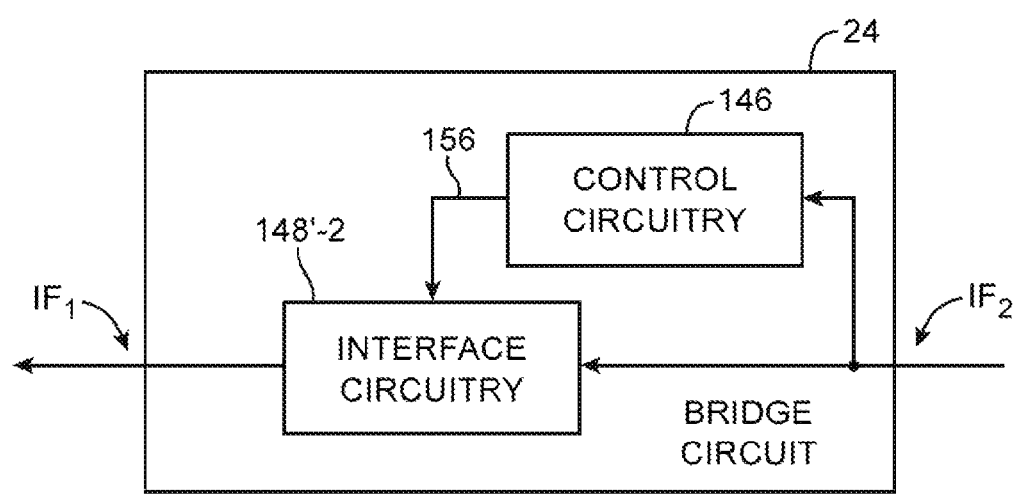
FIG. 12 is a diagram of an illustrative bridge circuit that may include a single interface circuit for unidirectional communications between first and second interfaces in accordance with an embodiment of the present invention.

If desired, interface circuitry 148'-1 may be omitted as shown in FIG. 12. In the example of FIG. 12, bridge circuit 24 may be provided with only interface circuitry 148'-2 that accommodates transmissions from interface IF2 to interface IF1. Bridge circuit 24 of FIG. 12 may, for example, be used in scenarios such as when dynamically reconfigurable circuitry coupled to interface IF2 transmits data to dedicated circuitry coupled to interface IF1, but the dedicated circuitry does not transmit any data to the dynamically reconfigurable circuitry (e.g., one-way communications from interface IF2 to interface IF1).

Figure 13:
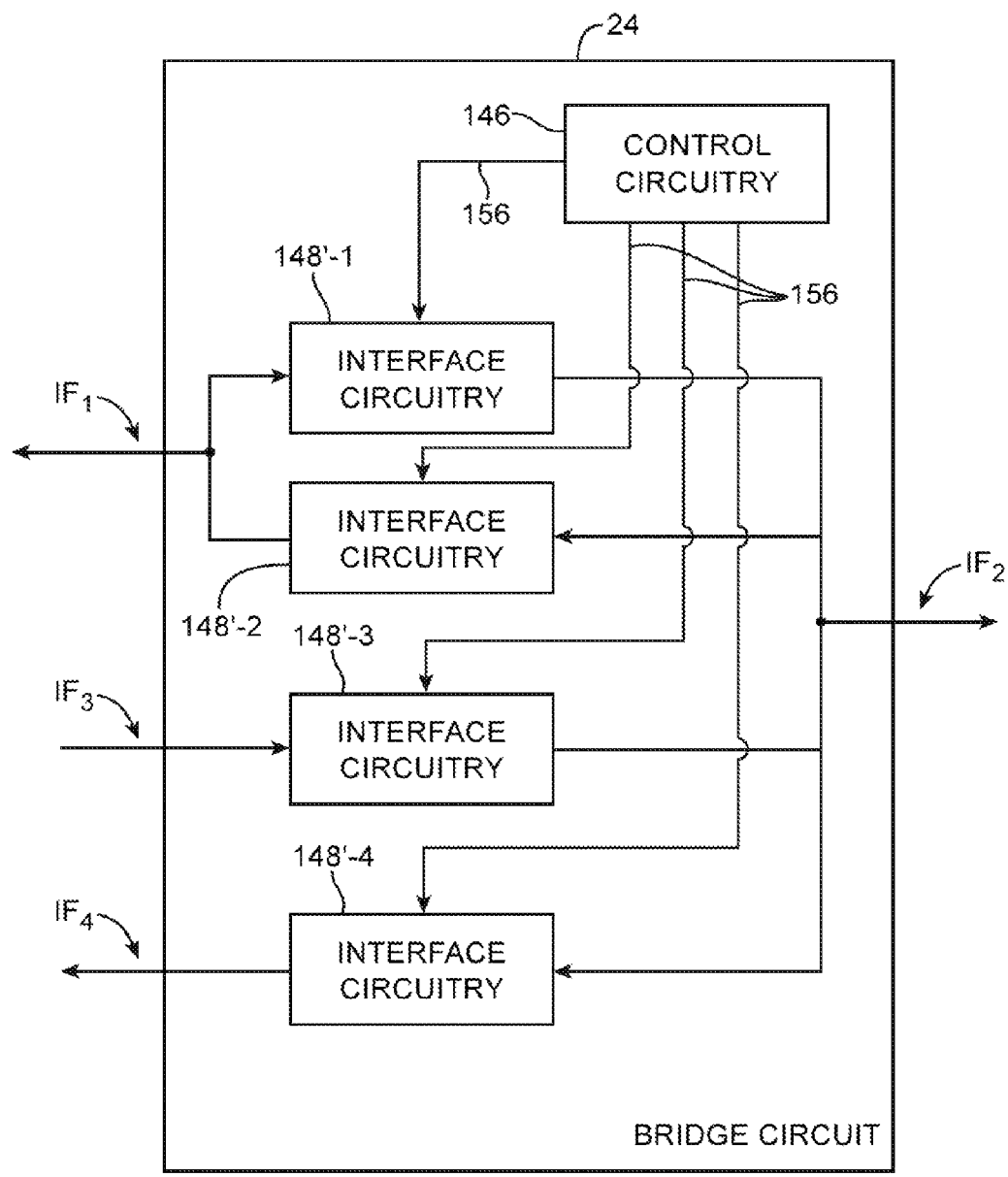
FIG. 13 is a diagram of an illustrative bridge circuit that may include multiple interface circuits for communications between multiple interfaces in accordance with an embodiment of the present invention.

FIG. 13 is a diagram of a bridge circuit that may be used to interface between multiple circuits. As shown in FIG. 13, bridge circuit 24 may include interfaces IF1, IF2, IF3, and IF4. Interfaces IF1, IF3, and IF4 may be coupled to corresponding circuitry (e.g., circuitry 122, 124, etc. of FIG. 4). Interface IF2 may be coupled to dynamically reconfigurable circuitry.

Bridge circuit 24 may include interface circuitry appropriate for a desired arrangement of communications between interface IF2 and interfaces IF1, IF3, and IF4. In the example of FIG. 13, two-way communications may be desired between interfaces IF1 and IF2, whereas one-way communications may be desired from interface IF3 to interface IF2 and from interface IF2 to interface IF4. Bridge circuit 24 may include interface circuitry 148'-1 and 148'-2 that accommodate two-way communications between interfaces IF1 and IF2. Bridge circuit 24 may include interface circuitry 148'-3 that handles transmissions from interface IF3 to interface IF2 and interface circuitry 148'-4 that handles transmissions from interface IF2 to interface IF4.

The example of FIG. 13 in which bridge circuit 24 performs bridging operations between four interfaces is merely illustrative. Bridge circuit 24 may include any desired number of interfaces (e.g., two, three, four, five, or more). Each interface may be coupled to one or more corresponding communications source/destinations. For example, an interface may be directly connected to a single communications source/destination circuit. As another example, an interface may be coupled to multiple communications sources and destinations via a communications bus. Bridge circuit 24 may include interface circuitry for each desired communications direction between pairs of interfaces.

Figure 14:
FIG. 14 is a diagram of an illustrative interface request that may be received by a bridge circuit in accordance with an embodiment of the present invention.

Bridge circuit 24 may receive information such as interface requirements from circuitry that is coupled to an interface of the bridge circuit. FIG. 14 is an illustrative of an interface request 222 that may be received by bridge circuit 24. The interface request may, for example, be sent by the dynamically reconfigurable circuitry prior to or in response to reconfiguration of the dynamically reconfigurable circuitry during normal operation of the device. The interface request may be received by control circuitry over the corresponding interface or may be sent via control paths associated with the corresponding interface.

As shown in FIG. 14, interface request 222 may include interface parameters such as requirements or constraints. The interface parameters may include bus width requirements, bandwidth constraints, timing requirements, clock attributes, address map information, priority assignments, and interface type information such as interface protocol information. If desired, interface request 222 may include any desired subset of these interface requirements or constraints or may include additional interface parameters. Control circuitry 146 may use the interface requirements and constraints in controlling the operations of interface circuitry of the bridge circuit.

The bus width requirements of interface request 222 may be used to control width conversion circuitry 174 of FIG. 6. For example, control circuitry 146 may provide control signals over control paths 156 to width conversion circuitry 174 that direct the width conversion circuitry to partition transaction data received at interface IF1 in portions having bit widths that correspond to the bus width requirements.

The bandwidth constraints of interface request 222 may identify the rate at which data may be conveyed over the corresponding interface. Control circuitry 146 may use the bandwidth constraints to determine how quickly transactions stored in a transaction buffer are processed (e.g., using interface conversion circuitry and timing circuitry) and transmitted over the interface.

The timing requirements of interface request 222 may include latency requirements such as ready-valid latency requirements or other timing requirements associated with control and/or data signals conveyed over the corresponding interface. Control circuitry 146 may use the timing requirements to control timing circuitry 166. For example, controller circuitry 146 may use ready-valid latency requirements to identify an appropriate starting counter value for counter 179 of latency compensation circuit 178.

The clock attributes of interface request 222 may include clock frequency information. Control circuitry 146 may use the clock attributes in controlling configurable clock crossing circuitry 180. For example, control circuitry 146 may select a clock signal matching the clock attributes for the clock crossing circuitry to use in providing signals to the corresponding interface. The clock signal may be selected from multiple available clock signals provided by clock generation circuitry. This example is merely illustrative. If desired, the clock signal used by the configurable clock crossing circuitry for a given interface may be provided at that interface.

The address map information of interface request 222 may include entries to be stored in an address remap table. Control circuitry 146 may direct address remapping circuitry 176 to use the address map information in address remapping operations. For example, the address map information may include entries 204, 206, and 208 of FIG. 8. In this scenario, control circuitry 146 may store the entries in address remap table 202. The entries may be stored in addition to or in place of existing entries of the address remap table (e.g., the existing entries may or may not be deleted).

The priority assignment information of interface request 222 may include rules indicating the priority that should be assigned to each transaction or type of transaction. The rules may include information that may be matched to all or portions of transactions that are stored in a transaction buffer. For example, each rule may assign a priority value to transactions having matching address information and/or data. Control circuitry 146 may provide the rules to priority sorting circuitry 162 for use in sorting transaction buffer 150.

The interface type information (e.g., interface protocol) of interface request 222 may be used by control circuitry 146 to control interface type conversion circuitry 172. For example, the interface type information may identify the protocol that is used for communications at the corresponding interface (e.g., a serial protocol, a parallel protocol, etc.). Control circuitry 146 may control the interface type conversion circuitry 172 to produce control and data signals accommodating the identified protocol.

Figure 15:
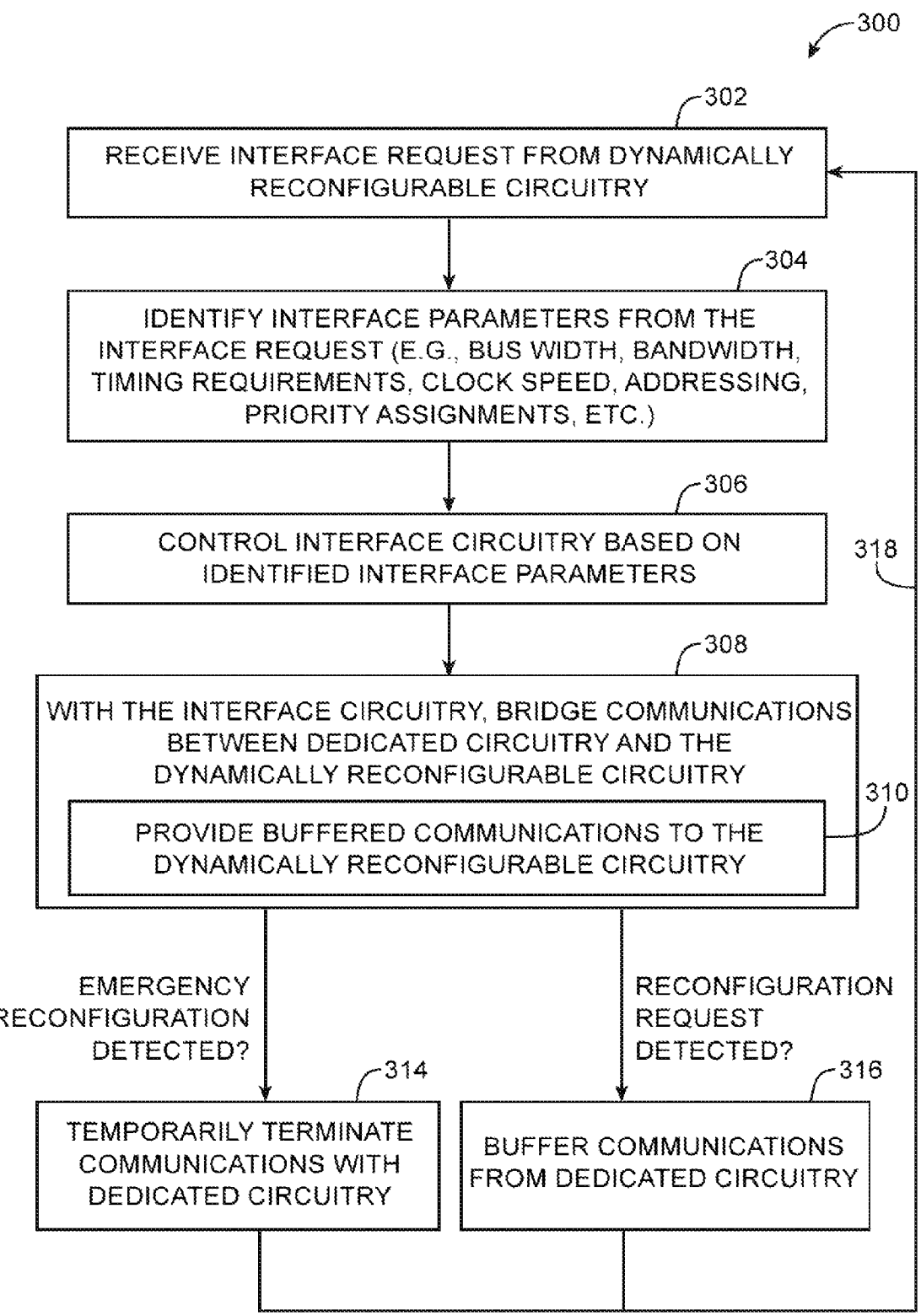
FIG. 15 is a flow chart of illustrative steps that may be performed by a bridge circuit to bridge communications between dedicated circuitry and dynamically reconfigurable circuitry without interrupting the dedicated circuitry in accordance with an embodiment of the present invention.

Bridge circuit 24 may operate so that bridging operations are performed without interfering with operations of dedicated circuitry that communicates with the bridge circuit. For example, bridge circuit 24 of FIG. 6 may bridge communications between interfaces IF1 and IF2 without interfering with operations of the dedicated circuitry that is coupled to interface IF1. In other words, the operations of bridge circuit 24 may be hidden from dedicated circuitry that is coupled to the bridge circuit. FIG. 15 is a flow chart of illustrative steps that may be performed by a bridge circuit such as bridge circuit 24 that interfaces between dynamically reconfigurable circuitry and dedicated circuitry.

During step 302, the bridge circuit may receive an interface request from the dynamically reconfigurable circuitry. For example, interface request 222 of FIG. 14 may be received by the bridge circuit.

During step 304, the bridge circuit may identify interface parameters such as communications requirements, constraints, or settings from the interface request. For example, parameters such as bus width information, bandwidth constraints, timing requirements, clock attributes such as clock speed or other clock parameters, addressing information such as address map parameters, priority assignment information, interface type such as interface protocol, or other interface parameters may be identified from the interface request.

During step 306, the bridge circuit may control (e.g., adjust) interface circuitry coupled between the reconfigurable circuitry and the dedicated circuitry based on the identified interface parameters. For example, control circuitry 146 of the bridge circuit may use the identified interface parameters to control interface type conversion circuitry, width conversion circuitry, address remapping circuitry, priority sorting circuitry, latency compensation circuitry, clock crossing circuitry, and/or other interface circuitry of the bridge circuit.

During step 308, the bridge circuit may use the interface circuitry to bridge communications between the dedicated circuitry and the dynamically reconfigurable circuitry based on the identified interface parameters. If desired, the bridge circuit may selectively reject transactions received at interfaces such as IF1, IF2, etc. that fail to match the identified parameters. For example, received transactions that do not match any addresses of address map parameters may be rejected and/or dropped. As another example, transactions received at an interface that fail to match the corresponding interface type may be rejected.

The operations of step 308 may include buffering communications (e.g., transactions) received from the dedicated circuitry using interface parameters associated with the dedicated circuitry. During step 308, the buffered communications may be provided to the dynamically reconfigurable circuitry using the identified interface parameters received from the dynamically reconfigurable circuitry (e.g., step 310).

Dynamically reconfigurable circuitry may provide a reconfiguration request prior to an interface request. The reconfiguration request may indicate that the dynamically reconfigurable circuitry will be reconfigured during normal operation. The reconfiguration request may be conveyed over an interface such as interface IF2 that is coupled to the reconfigurable circuitry. This example is merely illustrative. If desired, the dedicated circuitry may provide the reconfiguration request over an interface such as interface IF1 that is coupled to the dedicated circuitry. For example, the dedicated circuitry may control the configuration of the reconfigurable circuitry by conveying control information to the reconfigurable circuitry via the bridge circuit. In this scenario, the dedicated circuitry may send a reconfiguration request to the reconfigurable circuitry. The bridge circuit may detect the reconfiguration request received from the dedicated circuitry. As another example, a user may reconfigure the reconfigurable circuit during normal operation using configuration tools. In this scenario, the configuration tools may provide updated communications settings or requirements for to the bridge circuit.

The bridge circuit may detect emergency reconfiguration events such as in the case of operational errors or other unanticipated reconfigurations of the dynamically reconfigurable circuitry. Emergency reconfiguration events may be initiated by the dynamically reconfigurable circuitry, other circuitry on the device, or a user in response to emergency events. Emergency events may include soft errors such as single event upsets (e.g., temporary errors caused by background radiation), hard errors (e.g., long-term or permanent failures of the dynamically reconfigurable circuitry), and security breaches. As an example, error checking or monitoring circuitry on the device may be used to detect when soft or hard errors occur (e.g., by monitoring data paths or circuitry such as storage circuitry for cyclic redundancy check errors, bit flips, or other errors). The error checking or monitoring circuitry may communicate with the bridge circuit to identify the errors. In response to detecting an emergency reconfiguration event, the bridge circuit may perform the operations of step 314. If, during step 308, the bridge circuit receives a reconfiguration request for the dynamically reconfigurable circuitry, the operations of step 316 may be performed.

During step 314, the bridge circuit may temporarily terminate communications with the dedicated circuitry while the dynamically reconfigurable circuitry performs emergency reconfiguration operations. The communications with the dedicated circuitry may be terminated by deleting all existing entries in transaction buffers associated with the dedicated circuitry and/or dynamically reconfigurable circuitry and dropping all incoming transactions from the dedicated circuitry. The process may then return to step 302 to handle new configurations of the reconfigurable circuitry. By temporarily terminating communications with the dedicated circuitry, the bridge circuit may help to prevent communications errors (e.g., because an emergency reconfiguration of the reconfigurable circuitry may be incapable of receiving transactions that are associated with a previous configuration of the reconfigurable circuitry).

During step 316, the bridge circuit may buffer communications from the dedicated circuitry while the reconfigurable circuitry is being reconfigured. The buffered communications may be provided to the dynamically reconfigurable circuitry subsequent to completion of reconfiguration operations (e.g., during step 310). By buffering communications during reconfiguration operations, the bridge circuit may obscure the operations and status of the dynamically reconfigurable circuitry from the dedicated circuitry, which allows the dedicated circuitry to operate without interruptions.

The foregoing is merely illustrative of the principles of this invention and various modifications can be made by those skilled in the art without departing from the scope and spirit of the invention. The foregoing embodiments may be implemented individually or in any combination.

What is claimed is:

1. Circuitry, comprising:
    first and second communications interfaces, wherein communications requirements of the second communications interface vary based on changes to a communication protocol of the second communications interface from a first protocol to a second protocol;
    interface circuitry coupled between the first and second interfaces, wherein the interface circuitry has a first mode for processing communications of the first protocol and a second mode for processing communications of the second protocol; and
    control circuitry that controls the interface circuitry to switch between the first and second modes based on the variable communications requirements of the second interface without interrupting communications at the first interface while the first communications interface processes communications.

2. The circuitry defined in claim 1 wherein the first interface receives transactions and wherein the interface circuitry comprises a buffer that stores the received transactions.

3. The circuitry defined in claim 2 wherein the interface circuitry further comprises interface conversion circuitry that transmits information retrieved from the stored transactions from the second interface based on the variable communications requirements of the second interface.

4. The circuitry defined in claim 3 wherein the transactions are received at the first interface using a first protocol, wherein the variable communications requirements of the second interface identify a second protocol, and wherein the interface conversion circuitry comprises interface type conversion circuitry that transmits the information from the stored transactions from the second interface using the second protocol.

5. The circuitry defined in claim 4 wherein the first and second interfaces have respective first and second widths, wherein the transactions are associated with the first width, and wherein the interface conversion circuitry further comprises width conversion circuitry that converts the information from the stored transactions to the second width.

6. The circuitry defined in claim 5 wherein the transactions received at the first interface include addresses corresponding to a first address space, wherein the second interface is associated with a second address space, and wherein the interface conversion circuitry further comprises address remapping circuitry that maps the addresses of the first address space to the second address space.

7. The circuitry defined in claim 3 wherein the information transmitted at the second interface includes signals, wherein the variable communications requirements of the second interface include timing requirements, and wherein the interface circuitry further comprises timing circuitry that controls timing of the transmitted signals to satisfy the timing requirements.

8. The circuitry defined in claim 7 wherein the timing circuitry includes latency compensation circuitry that delays at least a portion of the transmitted signals to satisfy the timing requirements.

9. The circuitry defined in claim 7 wherein the first interface is associated with a first clock domain, wherein the second interface is associated with a second clock domain, and wherein the timing circuitry includes clock crossing circuitry that interfaces between the first and second clock domains.

10. The circuitry defined in claim 2 wherein the variable communications requirements include priority assignment information, wherein interface circuitry processes the stored transactions in the buffer in an order, and wherein the interface circuitry further comprises priority sorting circuitry that determines the order in which the stored transactions are processed based on the priority assignment information.

11. The circuitry defined in claim 1 wherein the first interface is coupled to dedicated circuitry that provides the transactions and wherein the second interface is coupled to dynamically reconfigurable circuitry that provides the variable communications requirements of the second interface.

12. A method of operating a bridge circuit having first and second interfaces that are coupled to respective circuitry, the method comprising:
with interface circuitry, receiving communications at the first interface;
with the interface circuitry, transmitting the received communications at the second interface using communications settings, wherein the communications settings comprise a communications protocol; and
while processing the communications at the first interface, using control circuitry to adjust the communications protocol used by the interface circuitry to transmit the received communications at the second interface without interrupting the communications at the first interface.

13. The method defined in claim 12 further comprising:
with storage circuitry, buffering the communications received at the first interface.

14. The method defined in claim 13 wherein the circuitry coupled to the second interface comprises dynamically reconfigurable circuitry, the method further comprising:
detecting a reconfiguration request for the dynamically reconfigurable circuitry coupled to the second interface, wherein buffering the communications received at the first interface comprises buffering the communications received at the first interface while the dynamically reconfigurable circuitry is being reconfigured.

15. The method defined in claim 13 further comprising:
with the control circuitry, receiving an interface request at the second interface; and
with the control circuitry, identifying interface parameters from the interface request, wherein adjusting the communications settings of the second interface without interrupting the communications at the first interface comprises adjusting the communications settings of the second interface based on the identified interface parameters.

16. The method defined in claim 15 wherein identifying the interface parameters from the interface request comprises identifying at least one interface parameter selected from the group consisting of: bus width parameters, bandwidth parameters, timing requirement parameters, clock parameters, address map parameters, and priority assignment parameters.

17. The method defined in claim 13 further comprising:
detecting an emergency reconfiguration event; and
in response to detecting the emergency reconfiguration event, temporarily terminating the communications at the first interface.

18. Apparatus, comprising:
circuitry;
dynamically reconfigurable circuitry that is reconfigurable between at least first and second configurations during normal operation of the circuitry, wherein the dynamically reconfigurable circuitry uses at least first and second communications protocols that are respectively associated to the at least first and second configurations during normal operation of the circuitry; and
a bridge circuit having a first interface coupled to the circuitry and a second interface coupled to the dynamically reconfigurable circuitry, wherein the bridge circuit interfaces between the circuitry and the first and second configurations of the dynamically reconfigurable circuitry without interrupting the circuitry, wherein the bridge circuit has a first mode associated with the first communications protocol and a second mode for associated with the second communications protocol, wherein the bridge circuit switches between the first and second modes based on the configurations of the dynamically reconfigurable circuitry.

19. The apparatus defined in claim 18 further comprising a communications bus that is coupled between the second interface of the bridge circuit and the dynamically reconfigurable circuitry.

20. The apparatus defined in claim 19 wherein the bridge circuit comprises a first bridge circuit, the apparatus further comprising:
a second bridge circuit that is coupled between additional circuitry and the communications bus, wherein the second bridge circuit interfaces between the additional circuitry and the first and second configurations of the dynamically reconfigurable circuitry over the communications bus without interrupting the additional circuitry.

21. The apparatus defined in claim 20 wherein the additional circuitry comprises:
a plurality of circuits that each communicate over the bus using the second bridge circuit.

22. The apparatus defined in claim 18 wherein the bridge circuit receives communications from the circuitry and wherein the bridge circuit includes a buffer that stores the received communications from the circuitry during reconfiguration operations of the dynamically reconfigurable circuitry.

* * * * *